(12) United States Patent
Miller et al.

(10) Patent No.: US 8,903,677 B2
(45) Date of Patent: Dec. 2, 2014

(54) INERTIAL NAVIGATION UNITS, SYSTEMS, AND METHODS

(75) Inventors: Paul Alan Miller, Harmony, PA (US); Thomas Andreas Trautzsch, Cranberry Township, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 511 days.

(21) Appl. No.: 13/040,370

(22) Filed: Mar. 4, 2011

(65) Prior Publication Data

US 2012/0226467 A1 Sep. 6, 2012

(51) Int. Cl.
| | |
|---|---|
| G01P 15/00 | (2006.01) |
| G01C 21/10 | (2006.01) |
| G01C 21/20 | (2006.01) |
| G01P 21/00 | (2006.01) |
| G01C 22/00 | (2006.01) |
| G01C 21/16 | (2006.01) |

(52) U.S. Cl.
CPC .............. *G01C 22/006* (2013.01); *G01C 21/16* (2013.01)
USPC .............. 702/141; 702/94; 702/104; 702/150

(58) Field of Classification Search
USPC .............. 702/141, 104, 41, 92, 94, 150, 151; 73/510, 514.01; 345/158
See application file for complete search history.

(56) References Cited

U.S. PATENT DOCUMENTS

| | | | |
|---|---|---|---|
| 5,724,265 A | 3/1998 | Hutchings | |
| 5,841,537 A | 11/1998 | Doty | |
| 5,899,963 A | 5/1999 | Hutchings | |
| 5,928,309 A | 7/1999 | Korver et al. | |
| 6,122,960 A | 9/2000 | Hutchings et al. | |
| 6,305,221 B1 | 10/2001 | Hutchings | |
| 8,185,101 B1 | 5/2012 | Wiseman et al. | |
| 2005/0011720 A1 | 1/2005 | Adair et al. | |
| 2005/0227650 A1 | 10/2005 | Williams | |
| 2006/0155584 A1 | 7/2006 | Aggarwal | |
| 2009/0326851 A1 | 12/2009 | Tanenhaus | |
| 2010/0156676 A1* | 6/2010 | Mooring et al. | ................ 341/20 |
| 2011/0054836 A1 | 3/2011 | Foxlin | |
| 2011/0098921 A1 | 4/2011 | Miller et al. | |
| 2012/0274447 A1 | 11/2012 | Hess | |

FOREIGN PATENT DOCUMENTS

| | | |
|---|---|---|
| EP | 1253404 A2 | 10/2002 |
| JP | 2009109324 A | 5/2009 |

OTHER PUBLICATIONS

U.S. Appl. No. 61/087,944, Krancher et al., filed Aug. 11, 2008.*
Foxlin, Pedestrian Tracking with Shoe-Mounted Inertial Sensors, IEEE Computer Society, Nov.-Dec. 2005, pp. 38-46.
Ali et al., Alignment of Strapdown Inertial Navigation System: A Literture Survey Spanned over the Last 14 years, pp. 1-12.

(Continued)

*Primary Examiner* — Michael Nghiem
*Assistant Examiner* — Ivan Rabovianski
(74) *Attorney, Agent, or Firm* — The Webb Law Firm

(57) ABSTRACT

Navigation units, systems, and methods for use in the context of personal navigation, and associated methods for initialization, navigation, assistance, and correction, all in the field of inertial navigation and related applications. The inertial navigation units, systems, and methods of the invention utilize multiple accelerometers to gather specific force data for improvement of the initialization, navigation, assistance, or corrective processes.

20 Claims, 1 Drawing Sheet

(56) References Cited

OTHER PUBLICATIONS

Gebre-Egziabher et al., A Gyro-Free Quaternion-Based Attitude Determination System Suitable for Implementation Using Low Cost Sensors, Position Location and Navigation Symposium IEEE, 2000, pp. 185-192.

Alonso et al., Centering and Observability in Attitude-Independent Magnetometer-Bias Determination, The Journal of the Astronautical Sciences, Apr.-Jun. 2003, pp. 133-141, vol. 51, No. 2.

Alonso et al., Twostep: A Fast Robust Algorithm for Attitude-Independent Magnetometer-Bias Determination, The Journal of the Astronautical Sciences, Oct.-Dec. 2002, pp. 433-451, vol. 50, No. 4.

Vasconcelos et al., A Geometric Approach to Strapdown Magnetometer Calibration in Sensor Frame, 2nd IFAC Workshop Navigation, Guidance, and Control of Underwater Vehicles, 2008, vol. 2, Part 1, Lakeside Hotel, Ireland.

Markley, Fast Quaternion Attitude Estimation from Two Vector Measurements, Journal of Guidance, Control, and Dynamics, 2002, pp. 411-414, vol. 25, No. 2.

Crassidis et al., Real-Time Attitude-Independent Three-Axis Magnetometer Calibration, Journal of Guidance, Control, and Dynamics, 2005, pp. 115-120, vol. 28, No. 1.

Alonso et al., Attitude-Independent Magnetometer-Bias Determination: A Survey, The Journal of the Astronautical Sciences, Oct.-Dec. 2002, pp. 453-475, vol. 50, No. 4.

Thomasson et al., Understanding the Fresnel Zone, Oct. 1996, 2 pages.

Woodman, An Introduction to Inertial Navigation, Technical Report No. 696, University of Cambridge Computer Laboratory, Aug. 2007, pp. 1-37.

Motorola's Canopy Wireless Broadband Platform: The Secure, Flexible, Reliable Wireless Solution for Building or Extending Your Broadband Network, Motorola, 2006, available at http://www.ptsupply.com/pdf/motorola_canopy_CanopyOverview-US.pdf.

Motorola Canopy Wireless Broadband 900 MHz Modules: Providing Reliable Broadband Service to Remote Customers with Canopy System 900 MHz Modules, Motorola, 2004, available at http://www.motorola.com/web/Business/_Documents/static%20files/900%20Mhz%20Module.

Motorola Canopy Wireless Broadband 2.4 GHz System, Motorola, 2003, available at http://www.motorola.com/web/Business/_Documents/static%20files/2.4%20GHz%20Canopy%20System.pdf?pLibItem=1&localeId=33.

Lehr et al., Wireless Internet Access: 3g vs. WiFi?, Telecommunications Policy, 2003, pp. 351-370, vol. 27.

Faulkner et al., GPS-denied Pedestrian Tracking in Indoor Environments Using an IMU and Magnetic Compass, Jun. 20, 2011, pp. 1-7.

\* cited by examiner

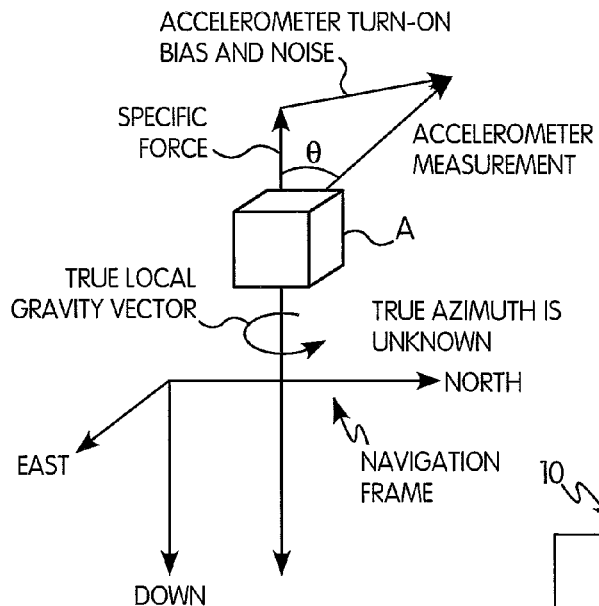
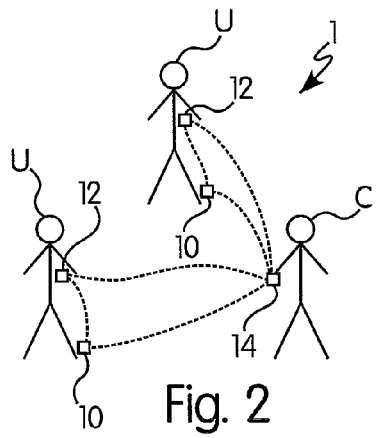
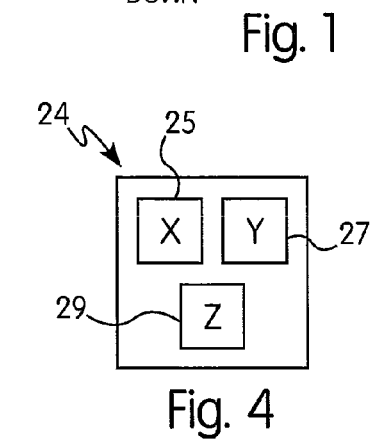
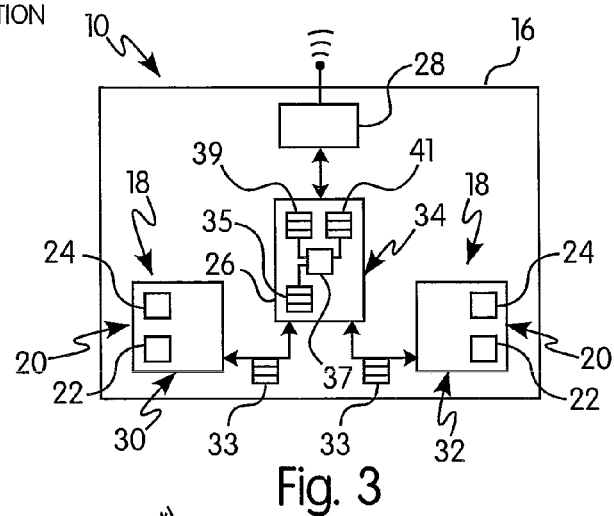
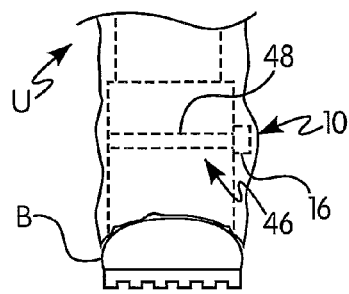
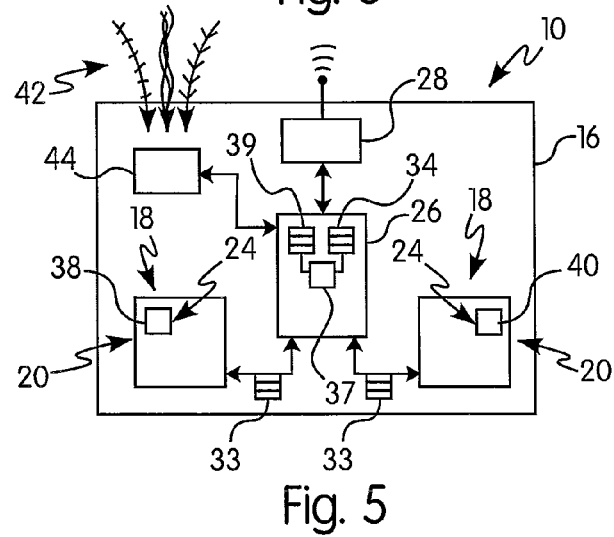

INERTIAL NAVIGATION UNITS, SYSTEMS, AND METHODS

BACKGROUND OF THE INVENTION

1. Field of the Invention

The present invention relates generally to navigational units, systems, and methods used in positioning applications, and in particular to inertial navigation units, systems, and methods for initialization, navigation, assistance, and correction, all in the field of inertial navigation and related applications.

2. Description of the Related Art

The present invention relates generally to units, systems, and methods of determining the location of mobile personnel and, particularly, to units, systems, and methods of determining the location of personnel working under specific conditions outdoors and/or within one or more structures. One type of navigating platform and architecture is an inertial navigation system (INS), which is a navigational aid that uses a computer (or controller) and certain sensors to continuously calculate, via dead reckoning, the position, orientation, and velocity of a moving object without the need for external references. An INS includes at least one computer (or controller) and a platform or module containing accelerometers, gyroscopes, or other motion-sensing devices. The advantage of an INS is that it requires no external references in order to determine its relative position, orientation, or velocity once it has been initialized.

Further, and with respect to inertial navigation systems, it is necessary to determine certain initial conditions for integration in the navigation routine. As is known, and upon power-up, an inertial navigation system has no knowledge of its attitude, velocity, position, or sensor biases. These quantities must be initialized to a best estimate of "truth." In certain known applications, this initial estimate is an average of the first few measurements or, alternatively, simply set to zero. However, in many applications, proper and more accurate initialization of attitude is crucial.

In a strap-down navigation system (such as a system that uses a portable navigation unit attached to a portion of the user, e.g., the user's ankle, boot, leg, and the like), where the inertial sensors are fixed to the unit's reference axes (i.e., body frame), it is necessary to understand the mathematical relationship between the navigation frame and the body frame. This relationship may be defined as a 3×3 rotation matrix, or direction cosine matrix. Alternate representations include quaternion, Euler angles, and the Euler axis/angle.

One goal, which is addressed by the present invention, is the desire to mitigate error in the computation of the system attitude using the accelerometer specific force vector. Accordingly, the present invention at set forth hereinafter is useful in connection with any inertial navigation system that utilizes the accelerometer specific force vector to align to the local gravity vector as the primary means of alignment. Certain common alignment and estimation techniques and methods that are used in a variety of applications are described in *Alignment of strapdown inertial navigation system: a literature survey spanned over the last 14 years*, by Jamshaid Ali and Fang Jiancheng, Technical report, School of Instrumentation Science and Optoelectronics Engineering, Beijing University of Aeronautics and Astronautics, Beijing 100083, China and *Fast quaternion attitude estimation from two vector measurements*, by F. Landis Markley, Journal of Guidance, Control, and Dynamics, 25(2):411-414, 2002.

As discussed, attitude initialization is crucial in applications with limited or no aiding measurements. While certain aiding measurements can mitigate alignment error, mathematical constraints may prevent total convergence. Further, error in attitude degrades inertial navigation performance by introducing error in the integration of total acceleration, which requires knowledge of the system attitude, the local gravity vector, and Coriolis force. These errors compound into the velocity estimate, and further into the position estimate, such that error growth in position is parabolic in nature.

Due to the mathematical relationship between accelerometer biases, noise, and tilt error, it is difficult and often impossible to initialize the attitude precisely. Specifically, such measurements provide limited observability for use in estimating the tilt error in the attitude estimate. Further, no physical measurements of velocity, position, or attitude are available to aid the navigation algorithm or its various routines, and/or to effectively improve performance of the inertial navigation unit. Therefore, and in order to optimize performance, it is important to understand the "true" system attitude upon initialization.

In view of these and other shortcomings of known navigation and tracking systems, a need exists for new approaches to personal navigation and tracking. It is, therefore, desirable to develop improved units, systems, and methods for accurately determining the location of mobile personnel, which reduce the severity of or eliminate the above-described drawbacks and other problems with current location units, systems, and methods.

SUMMARY OF THE INVENTION

Accordingly, the present invention provides an inertial navigation system and unit, and associated methods that address or overcome certain drawbacks and deficiencies existing in known inertial navigation systems and units. Generally, the present invention provides an inertial navigation system and unit, and associated methods that lead to accurate system initialization. Preferably, the present invention provides an inertial navigation system and unit, and associated methods that are useful in connection with existing and available inertial sensor systems, such as a consumer-grade inertial sensor. Preferably, the present invention provides an inertial navigation system and unit, and associated methods that aid the inertial navigation system. Preferably, the present invention provides an inertial navigation system and unit, and associated methods that improve the accuracy of the navigation data generated by the inertial navigation system. Preferably, the present invention provides an inertial navigation system and unit, and associated methods that selectively use specific force data from multiple accelerometers to: initialize certain components of the inertial navigation system, generate navigation data, assist the navigational components of the system, and/or correct information and data used in connection with one or more routines within a navigation algorithm of the system.

In one preferred and non-limiting embodiment, the present invention provides an inertial navigation unit having an initialization accelerometer operating in a first dynamic range and configured to generate specific force data and a navigation accelerometer operating in a second dynamic range and configured to generate specific force data. Further, the unit includes at least one controller programmed, configured, or adapted to: (i) determine initialization data based at least in part upon the specific force data generated by the initialization accelerometer; (ii) apply at least a portion of the initialization data to at least one navigation routine; and (iii) generate navigation data based at least in part upon the specific force data of the navigation accelerometer and the at least one navigation routine. The initialization data includes at least one of the following: attitude data, tilt data, specific force data, acceleration data, bias data, error data, orientation data, rotation data, noise data, drift data, or any combination thereof.

In another preferred and non-limiting embodiment, the present invention provides a method of initializing an inertial navigation unit, including: generating specific force data by an initialization accelerometer operating in a first dynamic range; determining initialization data based at least in part upon the specific force data generated by the initialization accelerometer; applying at least a portion of the initialization data to at least one navigation routine; and generating navigation data based at least in part upon the specific force data of a navigation accelerometer, which is operating in a second dynamic range, and the at least one navigation routine. The initialization data includes at least one of the following: attitude data, tilt data, specific force data, acceleration data, bias data, error data, orientation data, rotation data, noise data, drift data, or any combination thereof.

In a further preferred and non-limiting embodiment, the present invention provides an inertial navigation unit including a reference accelerometer operating in a first dynamic range and configured to generate specific force data and a navigation accelerometer operating in a second dynamic range and configured to generate specific force data. The unit also includes at least one controller programmed, configured, or adapted to: (i) determine reference data based at least in part upon the specific force data generated by the reference accelerometer; (ii) generate navigation data based at least in part upon the specific force data generated by the navigation accelerometer and at least one navigation routine; and (iii) at least one of: (a) validate at least a portion of the navigation data; (b) validate at least a portion of the specific force data generated by the navigation accelerometer; (c) modify at least a portion of the at least one navigation routine using at least a portion of the reference data; (d) set at least one of the following: bias data, error data, drift data, tilt data, or any combination thereof, used by the at least one navigation routine to generate navigation data; or any combination thereof.

In another preferred and non-limiting embodiment, the present invention provides an inertial navigation method, including generating specific force data by a reference accelerometer operating in a first dynamic range; determining reference data based at least in part upon the specific force data generated by the reference accelerometer; generating navigation data based at least in part upon specific force data generated by a navigation accelerometer, which is operating in a second dynamic range, and at least one navigation routine; and at least one of: (a) validating at least a portion of the navigation data; (b) validating at least a portion of the specific force data generated by the navigation accelerometer; (c) modifying at least a portion of the at least one navigation routine using at least a portion of the reference data; (d) setting at least one of the following: bias data, error data, drift data, tilt data, or any combination thereof, used by the at least one navigation routine to generate navigation data; or any combination thereof.

In a still further preferred and non-limiting embodiment, the present invention provides an inertial navigation unit including a reference accelerometer operating in a first dynamic range and configured to generate specific force data and a navigation accelerometer operating in a second dynamic range and configured to generate specific force data. Further provided is at least one controller programmed, configured, or adapted to: (i) determine whether the navigation accelerometer is experiencing force within the first dynamic range; (ii) if the navigation accelerometer is experiencing force within the first dynamic range, determine reference data based at least in part upon the specific force data generated by the reference accelerometer; (iii) apply at least a portion of the reference data to at least one navigation routine; and (iv) generate navigation data based at least in part upon the at least one navigation routine.

In a further preferred and non-limiting embodiment, the present invention provides a method of navigating using an inertial navigation unit, including determining whether a navigation accelerometer, which operates in a second dynamic range, is experiencing force in a first dynamic range that is within the second dynamic range; and if the navigation accelerometer is experiencing force in the first dynamic range, determining reference data based at least in part upon the specific force data generated by a reference accelerometer, which operates in the first dynamic range; applying at least a portion of the reference data to at least one navigation routine; and generating navigation data based at least in part upon the at least one navigation routine.

In yet another preferred and non-limiting embodiment, the present invention provides an inertial navigation unit including a navigation accelerometer operating in a first dynamic range and configured to generate specific force data and an event accelerometer operating in a second dynamic range and configured to generate specific force data. The unit also includes at least one controller programmed, configured, or adapted to: (i) determine at least one navigational condition; and (ii) based at least in part upon the navigational condition, either: (a) generate navigation data based at least in part upon the specific force data generated by the navigation accelerometer and at least one navigation routine; or (b) generate navigation data based at least in part upon specific force data generated by the event accelerometer and the at least one navigation routine.

In another preferred and non-limiting embodiment, the present invention provides a method of navigating using an inertial navigation unit including a navigation accelerometer operating in a first dynamic range and configured to generate specific force data and an event accelerometer operating in a second dynamic range and configured to generate specific force data, wherein the second dynamic range is greater than the first dynamic range. The method includes: determining at least one navigational condition; and based at least in part upon the navigational condition, either: (a) generating navigation data based at least in part upon the specific force data generated by the navigation accelerometer and at least one navigation routine; or (b) generating navigation data based at least in part upon specific force data generated by the event accelerometer and the at least one navigation routine.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1 is an alignment vector diagram for an inertial navigation system;

FIG. 2 is a schematic view of one embodiment of an inertial navigation system according to the principles of the present invention;

FIG. 3 is a schematic view of additional embodiments of an inertial navigation unit according to the principles of the present invention;

FIG. 4 is a schematic view of another embodiment of an accelerometer in an inertial navigation unit according to the principles of the present invention;

FIG. 5 is a schematic view of a further embodiment of an inertial navigation unit according to the principles of the present invention; and FIG. 6 is a front view of another embodiment of an inertial navigation unit according to the principles of the present invention and worn by a user.

DETAILED DESCRIPTION OF THE PREFERRED EMBODIMENT(S)

It is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As discussed hereinafter, an initial consideration in the field of navigation is the reference frames, or coordinate systems, and their relationships between each other. These reference frames include the inertial frame i, the Earth-centered, Earth-fixed frame e, a north-east-down tangent frame t, and the body frame b. The inertial frame i is Earth-centered with the z axis parallel to the Earth's spin axis and passing through the North Pole. This reference frame is non-rotating, non-accelerating, and is not subject to gravity. Newton's laws apply in this frame. The Earth-centered, Earth-fixed (ECEF) frame e has an x axis extending through the intersection of the prime meridian and equator, and the z axis parallel to the Earth's spin axis and passing through the North Pole. This frame rotates about the z axis of the inertial frame with an angular rate:

$$\omega_{i/e} \approx 7.292115 \times 10^{-5} \text{ rad/sec}.$$

Tangent and fixed to the Earth's surface is the tangent frame t. This tangent frame has a geographic origin of latitude $\phi$, longitude $\lambda$, and height h ($\phi$, $\lambda$, h), with x axis pointing north, y axis pointing east, and z axis pointing down. The rotation between the ECEF frame and the tangent frame is:

$$R_e^t = \begin{bmatrix} -\sin\phi\cos\lambda & -\sin\phi\sin\lambda & \cos\phi \\ -\sin\lambda & \cos\lambda & 0 \\ -\cos\phi\cos\lambda & -\cos\phi\sin\lambda & -\sin\phi \end{bmatrix}. \quad (1)$$

The Earth's rotation expressed in the tangent frame is:

$$\omega_{i/t}^t = R_e^t \begin{bmatrix} 0 \\ 0 \\ \omega_{i/e} \end{bmatrix} = \begin{bmatrix} \cos\phi \\ 0 \\ -\sin\phi \end{bmatrix} \omega_{i/e}. \quad (2)$$

Finally, the body frame b navigates relative to the tangent frame, and it is assumed that the sensor frame and body frame are identical.

To understand the kinematic relationships between the body and inertial frames, let vector $r_{i/b}$ describe the position of the body b relative to the inertial frame. Vector $p_{i/t}$ describes the position of the tangent frame origin relative to the inertial frame origin. Vector $r_{t/b}$ describes the position of the body relative to the tangent frame origin. The position of the body is as follows:

$$r_{i/b}^i = \rho_{i/t}^i + r_{t/b}^i = \rho_{i/t}^i + R_t^i r_{t/b}^t. \quad (3)$$

Differentiating (3) with respect to time yields the velocity of the body relative to the inertial frame as follows:

$$\dot{r}_{i/b}^i = \dot{\rho}_{i/t}^i + \dot{R}_t^i r_{t/b}^t + R_t^i \dot{r}_{t/b}^t \quad (4)$$
$$= \dot{\rho}_{i/t}^i + R_t^i \Omega_{i/t}^t r_{t/b}^t + R_t^i \dot{r}_{t/b}^t$$
$$= \dot{\rho}_{i/t}^i + R_t^i [\Omega_{i/t}^t r_{t/b}^t + \dot{r}_{t/b}^t],$$

where matrix $\Omega_{i/t}^t$ is the skew symmetric form of vector $\omega_{i/t}^t$. Differentiating (4) with respect to time yields the acceleration of the body relative to the inertial frame is as follows:

$$\ddot{r}_{i/b}^i = \ddot{\rho}_{i/t}^i + \dot{R}_t^i [\Omega_{i/t}^t r_{t/b}^t + \dot{r}_{t/b}^t] + \quad (5)$$
$$R_t^i [\dot{\Omega}_{i/t}^t r_{t/b}^t + \Omega_{i/t}^t \dot{r}_{t/b}^t + \ddot{r}_{t/b}^t]$$
$$= \ddot{\rho}_{i/t}^i + R_t^i \Omega_{i/t}^t [\Omega_{i/t}^t r_{t/b}^t + \dot{r}_{t/b}^t] +$$
$$R_t^i [\dot{\Omega}_{i/t}^t r_{t/b}^t + \Omega_{i/t}^t \dot{r}_{t/b}^t + \ddot{r}_{t/b}^t]$$
$$= \ddot{\rho}_{i/t}^i + R_t^i [\Omega_{i/t}^t \Omega_{i/t}^t r_{t/b}^t + 2\Omega_{i/t}^t \dot{r}_{t/b}^t + \dot{\Omega}_{i/t}^t r_{t/b}^t + \ddot{r}_{t/b}^t].$$

Solving (5) for the acceleration of the body relative to the tangent frame (i.e., $\ddot{r}_{t/b}^t$) yields:

$$\ddot{r}_{t/b}^t = R_i^t [\ddot{r}_{i/b}^i - \ddot{\rho}_{i/t}^i] - \Omega_{i/t}^t \Omega_{i/t}^t r_{t/b}^t - 2\Omega_{i/t}^t \dot{r}_{t/b}^t - \dot{\Omega}_{i/t}^t r_{t/b}^t \quad (6)$$
$$= \ddot{r}_{i/b}^t - \ddot{\rho}_{i/t}^t - \Omega_{i/t}^t \Omega_{i/t}^t r_{t/b}^t - 2\Omega_{i/t}^t \dot{r}_{t/b}^t - \dot{\Omega}_{i/t}^t r_{t/b}^t$$
$$= (f_{i/b}^t + G_{i/b}^t) - \ddot{\rho}_{i/t}^t - \Omega_{i/t}^t \Omega_{i/t}^t r_{t/b}^t - 2\Omega_{i/t}^t \dot{r}_{t/b}^t - \dot{\Omega}_{i/t}^t r_{t/b}^t$$
$$= f_{i/b}^t + (G_{i/b}^t - \Omega_{i/t}^t \Omega_{i/t}^t r_{t/b}^t) - \ddot{\rho}_{i/t}^t - 2\Omega_{i/t}^t \dot{r}_{t/b}^t - \dot{\Omega}_{i/t}^t r_{t/b}^t$$
$$\approx f_{i/b}^t + g_{i/b}^t - 2\Omega_{i/t}^t \dot{r}_{t/b}^t,$$

where inertial acceleration $\ddot{r}_{i/b}^t$ been substituted with the accelerometer specific force $f_{i/b}^t$ plus position dependent gravitational acceleration $G_{i/b}^t$ (i.e., $\ddot{r}_{i/b}^t = f_{i/b}^t + G_{i/b}^t$). The local gravity vector, $g_{i/b}^t$, as represented in the tangent frame, is $(G_{i/b}^t - \Omega_{i/t}^t \Omega_{i/t}^t r_{t/b}^t)$. It is assumed that the tangent frame origin is fixed and accelerating, such that $\dot{\rho}i/t=0$, and the Earth rotational rate is constant, i.e., $\dot{\Omega}i/t=0$.

FIG. 1 is an alignment vector diagram for an inertial navigation system, where the system is stationary and the true azimuth is unknown without an additional reference. The accelerometer triad A measures the vector sum of the specific force vector, accelerometer turn-on biases, and accelerometer measurement noise. The direction of the specific force vector may not align with the true local gravity vector as a result of bias, noise, or acceleration. If the accelerometer measurement does not align with the local gravity vector, a tilt error $\theta$ will result in the initial attitude estimate.

Expression (6) relates the total acceleration of the body with respect to the tangent frame $\ddot{r}_{t/b}^t$, specific force vector $f_{i/b}{}^t$, local gravity vector $g_{i/b}{}^t$, and the Coriolis acceleration $-2\Omega_{i/t}{}^t \dot{r}_{t/b}{}^t$. When stationary, the total acceleration and Coriolis acceleration are zero, thus $$f_{i/b}{}^t \approx g_{i/b}{}^t \text{ or } f_{i/b}{}^b \approx -R_t^b g_{i/b}{}^t. \quad (7)$$

Rotation matrix $R_t^b$ describes the system attitude. The specific force $f_{i/b}{}^b$ is measured via accelerometer measurement: $y_a{}^b = f_{i/b}{}^b + b_a{}^b + n_a{}^b$, (8), which contains sensor bias $b_a{}^b$ and noise $n_a{}^b$. The local gravity vector, $g_{i/b}{}^t$, is approximated using an Earth model and knowledge of the system geodetic coordinate ($\phi, \lambda, h$). Given this information, the next step is to solve for $R_t^b$. In particular, expression (7) is solved for $R_t^b$ using knowledge of the local gravity vector and the accelerometer specific force measurement (8). Expression (7) is manipulated such that:

$$R_t^b = -f_{i/b}{}^b (g_{i/b}{}^t)^\tau [g_{i/b}{}^t (g_{i/b}{}^t)^\tau]^{-1}.$$

However, it also holds that $g_{i/b}{}^t (g_{i/b}{}^t)^\tau$ will always be rank 1 (i.e., not full rank), and thus a unique solution does not exist. With respect to the vector diagram in FIG. 1, the specific force is known within the body frame, while the local gravity vector is known in the navigation frame. This information allows one to resolve tilt, yet provides no information concerning azimuth. Additional information is necessary to solve for $R_t^b$. It is necessary to have knowledge of at least two linearly independent vectors described in both the body and navigation frames to solve for $R_t^b$ uniquely.

Because true azimuth is unknown, and no additional information is available in our system, it is necessary to assume an arbitrary second vector. This case implies that the accelerometer specific force measurement aligns exactly with the local gravity vector. Due to accelerometer measurement bias and noise, it is recognized that this assumption will not yield perfect results. Regardless, without additional information, this technique is the best option.

Next, the sub-optimal quaternion estimation method (as set forth in the Markley reference is used to solve (7) for $R_t^b$, where it is assumed that the accelerometer specific force vector aligns exactly with the local gravity vector. Vector $b_1$ describes the accelerometer specific force vector. Vector $r_1$ describes the local gravity vector. Vector $r_2$ is chosen to be perpendicular to $r_1$, where:

$$r_2 = [1\ 0\ 0]^{-\tau}$$

It is then assumed that vector $b_2$ is equivalent to $r_2$. The result of this calculation is a coupling between tilt error and accelerometer bias and noise, which creates a tilt error in the initial attitude estimate. Hence, a reduction in the accelerometer bias and noise will reduce the initial tilt error.

For example, a horizontal bias of 10 mg equates to a tilt error of 0.57°. A tilt error of 0.57° could create a vertical error of 1% distance traveled. Additional error will result from the horizontal bias. A horizontal bias of 50 mg equates to a tilt error of 2.86°. A horizontal bias of 100 mg equates to a tilt error of 5.71°. If the algorithm is unable to estimate the accelerometer bias error and tilt error, the resulting position estimate will degrade.

In general, and in one preferred and non-limiting embodiment illustrated in FIG. 2, the present invention is directed to an inertial navigation system 1, which includes at least one inertial navigation unit 10, a personal communication device 12, and an onsite computer 14. The inertial navigation unit 10 (e.g., a personal inertial navigation module) is typically portable and removably attached to a user U, e.g., a firefighter, such as on a boot B of the user U (see FIG. 6).

Further, and with reference to FIG. 3, the inertial navigation unit 10 includes a housing 16 surrounding at least one inertial navigation unit 18 comprising at least one sensor 20. The inertial navigation unit 10 may include one or more sensors 20, such as at least one gyroscope 22, at least one accelerometer 24, or the like. It should be noted that, as used hereinafter, an accelerometer may comprise a unit or sensor that is configured or arranged to measure accurate acceleration and generate specific force data along one or more axes, e.g., the x-, y-, and z-axis (often referred to as an accelerometer triad, i.e., an x-accelerometer 25, a y-accelerometer 27, and a z-accelerometer 29 (see FIG. 4)). Accordingly, such an accelerometer senses and produces data associated with magnitude, velocity, and direction, such that it can be used to sense orientation, vibration, shock, and the like. As used herein, the accelerometer may be used alone or in connection with a gyroscope 22 (or other sensors) in the context of the inertial navigation unit 10 operating in an inertial navigation system 1.

The output of each gyroscope 22 (i.e., angular rate sensor) can, for example, be integrated once to determine the angles defining the orientation of the sensors 22 as a function of time. Therefore, these angles define a translational coordinate system that varies in three dimensions throughout a stride. The output of each accelerometer 24 is integrated twice in the reference coordinate systems to determine a distance in each of the x-, y-, and z-directions. These values are then used to calculate a new location point relative to a previous point.

Further, and in this preferred and non-limiting embodiment, the inertial navigation unit 10 includes a controller 26 that is programmed or configured to interface with the sensors 20 and obtain the necessary data to perform certain automated calculations and determinations (e.g., the above-discussed integrations and other calculations performed through the execution of various navigation routines, calculations, and/or algorithms). This resulting data can be transmitted or delivered for use in further processes or in connection with additional calculations and determinations, such as navigational calculations, initialization calculations, validation calculations, and/or any of the calculations and algorithms set forth and discussed above and hereinafter.

The navigation data and/or the determinations and resultant data can be used within the inertial navigation system 1 in order to facilitate the effective tracking of multiple users U or objects in a given environment. It should further be noted that the controller 26 may be remote from the inertial navigation unit 10, and can receive the raw (or measured, e.g., specific force) data through wireless or hardwired communication. Preferably, however, the controller 26 is positioned locally and within the housing 16 of the inertial navigation unit 10, i.e., the personal inertial navigation module.

The inertial navigation unit 10 may be in wireless communication, via a local communication device 28, with the personal communication device 12, which is also worn by the user U, typically on the user's jacket. The personal communication device 12 is programmed or configured to wirelessly transmit data to the onsite computer 14, which is normally operated by a site coordinator C, e.g., the commander. It is further envisioned that the raw data or the resulting (determined) data can be transmitted directly from the inertial navigation unit 10 to the onsite computer 14, or some other desired destination.

With specific respect to the inertial navigation unit 10 of the present invention, it is recognized that accelerometers with low dynamic range normally have greater stability characteristics than those with high dynamic range. These stability characteristics include the magnitude of turn-on biases, long-term bias stability, thermal stability, and noise density. Accordingly, and in one preferred and non-limiting embodiment as illustrated in FIG. 3, the present invention is directed to an inertial navigation unit 10 that utilizes a first accelerometer 30, operating as an initialization accelerometer, and a second accelerometer 32, operating as a navigation accelerometer, both of which are configured to measure and/or generate specific force data 33. In one preferred and non-limiting embodiment, the first (initialization) accelerometer 30 and second (navigation) accelerometer 32 are in the form of an accelerometer triad, and are co-located and rigidly coupled to each other. Further, the first (initialization) accelerometer 30 operates in a first dynamic range, and the second (navigation) accelerometer 32 operates in a second dynamic range.

Further, at least one controller 26 is provided and programmed or configured to determine certain desired data 34 through the use of certain programs or routines. In this preferred and non-limiting embodiment, the controller 26 measures, determines, or calculates initialization data 35 based at least in part upon the specific force data 33 generated by the first (initialization) accelerometer 30. This initialization data 35 includes, without limitation, attitude data, tilt data, specific force data, acceleration data, bias data, error data, orientation data, rotation data, noise data, and/or drift data.

The controller 26 is further programmed or configured to apply at least a portion of the initialization data 35 to at least one navigation routine 37, and generate navigation data 39 based at least in part upon the specific force data 33 of the second (navigation) accelerometer 32 and the at least one navigation routine 37. In one preferred and non-limiting embodiment, the data 34 includes attitude initialization data, which is then utilized and/or applied during an initialization process and/or navigation routine. Further, it should be noted that one or both of the accelerometers 30, 32 may generate data that is used for the purpose of navigation in any applicable portion of the inertial navigation system 1. Still further, the data 34, specific force data 33, initialization data 35 and/or navigation data 39 can be in the form of data and information that is used in an initialization, navigation, validation, and/or correction process (as discussed hereinafter).

In order to improve attitude initialization performance, it is recognized that a more stable sensor will improve the characteristics of these critical parameters. Reduction in the accelerometer bias and noise, for example, will reduce the initial tilt error upon initialization. Accordingly, in this embodiment, the first (initialization) accelerometer 30 and the second (navigation) accelerometer operate effectively in different operating ranges, where the second dynamic range of the second (navigation) accelerometer 32 is greater than the first dynamic range of the first (initialization) accelerometer 30. In one embodiment, the first (initialization) accelerometer 30 is not capable of or configured to effectively provide accurate measurements at the navigation rate. Instead, the first (initialization) accelerometer 30 functions as a stable reference for providing specific force data 33 for use in the initialization process (for improving attitude initialization and performance), while the second (navigation) accelerometer 32 generates the ongoing specific force data 33 for use in navigation activities and navigation routines (together with other data generated from the other sensors 20, e.g., a gyroscope 22). In a further embodiment, at least a portion of the navigation data 39 obtained from the first accelerometer 30 and/or the second accelerometer 32 can be effectively used to: dynamically correct navigation data, dynamically validate navigation data, initialize at least one condition or variable in the navigation routine 37, determine various data points, or any combination thereof.

In this preferred and non-limiting embodiment, the first dynamic range of the first (initialization) accelerometer 30 is from about −2 g to about +2 g, and in another preferred and non-limiting embodiment, from about −1.7 g to about +1.7 g. The second dynamic range of the second (navigation) accelerometer 32 is from about −50 g to about +50 g; thus, the stability characteristics of the first (initialization) accelerometer 30 exceed those of the second (navigation) accelerometer 32, which can generate data 34 at the required navigation rate.

In another preferred and non-limiting embodiment, the first accelerometer 30 is in the form of a reference accelerometer, and the second accelerometer 32 is in the form of a navigation accelerometer. In this embodiment, the first (reference) accelerometer 30 again operates in the first dynamic range and the second (navigation) accelerometer 32 operates in the second dynamic range, and the second dynamic range of the second (navigation) accelerometer 32 is greater than the first dynamic range of the first (reference) accelerometer 30. Further, the controller 26 is configured or programmed to: determine reference data 41 based at least in part upon the specific force data 33 generated by the first (reference) accelerometer 30; and generate navigation data 39 based at least in part upon the specific force data 33 generated by the second (navigation) accelerometer 32 and the at least one navigation routine 37. In addition, the controller 26 is configured or programmed to: (a) validate at least a portion of the navigation data 39; (b) validate at least a portion of the specific force data 33 generated by the second (navigation) accelerometer 32; (c) modify at least a portion of the at least one navigation routine 37 using at least a portion of the reference data 41; and/or (d) set at least one of the following: bias data, error data, drift data, tilt data, or any combination thereof, used by the at least one navigation routine 37 to generate navigation data 39.

Accordingly, when the accelerometer specific force measurement of the second (navigation) accelerometer 32 is below the dynamic range of the first (reference) accelerometer 30, the first (reference) accelerometer 30 provides an alternate measurement of specific force. In such a case, it is assumed that this measurement is more accurate than that of the second (navigation) accelerometer 32 for use in further determinations (e.g., a navigation routine 37). Further, during initialization of the inertial navigation unit 10, where the unit is stationary, the first (reference) accelerometer 30 can be used as a more accurate measurement of the specific force vector. The result is an initial attitude with less tilt error. Furthermore, the first (reference) accelerometer 30 can specify initial bias estimates of the second (navigation) accelerometer 32 to be utilized in the inertial navigation unit 10 and inertial navigation system 1.

Additionally, the use of the first (reference) accelerometer 30 can be used to aid the inertial navigation system 1 (e.g., the navigation routines 37) during the navigational process. When the accelerometer specific force measurement of the second (navigation) accelerometer 32 is below the dynamic range of the first (reference) accelerometer 30, the residual between the navigation algorithm's specific force estimate $y_R^b$ and the first (reference) accelerometer 30 output $\hat{f}_{i/b}^b$ is:

$$\hat{f}_{i/b}^b - y_R^b = \left(y_N^b - \hat{b}_N^b\right) - (f_{i/b}^b + b_R^b + n_R^b) \qquad (9)$$
$$= \left(f_{i/b}^b + b_N^b - \hat{b}_N^b + n_N^b\right) - (f_{i/b}^b + b_R^b + n_R^b)$$
$$= \delta b_N^b - b_R^b + n_N^b - n_R^b,$$

where subscript N indicates the navigation accelerometer and subscript R indicates the reference accelerometer. Vector pairs ($b_N^b$, $n_N^b$) and ($b_R^b$, $n_R^b$) represent the bias and noise of the second (navigation) accelerometer 32 and the first (reference) accelerometer 30, respectively. The hat (^) notation refers to an estimated quantity of the navigation algorithm, where the delta ($\delta$) is the error between truth and the estimate. Expression (9) can then be utilized in a navigation algorithm (or routine 37) to estimate the second (navigation) accelerometer's 32 bias error within the magnitude of the first (reference) accelerometer's 30 bias and noise.

Another capability is to provide a check of the second (navigation) accelerometer 32 estimates. It is expected that the result of expression (9) be within the magnitude of the first (reference) accelerometer's 30 bias and noise. A navigation algorithm (or routine 37) may then be used to validate measurement corrections utilizing these criteria. If a measurement attempts to move the second (navigation) accelerometer's 32 bias estimate, such that (9) exceeds some magnitude, then that measurement could be ignored.

In this embodiment, the first dynamic range of the first (reference) accelerometer 30 is from about −2 g to about +2 g, and in another preferred and non-limiting embodiment, from about −1.7 g to about +1.7 g. The second dynamic range of the second (navigation) accelerometer 32 is from about −50 g to about +50 g. Therefore, the specific force data 33 generated by the first (reference) accelerometer 30 can be used to validate the navigation data 39, aid the navigation process, modify one or more of the conditions or values in a navigation routine 37, and/or set various data points used in a navigation routine 37. By using accelerometers 30, 32 operating in different dynamic ranges, critical data can be obtained to increase the overall accuracy and precision of the navigational process.

In a still further preferred and non-limiting embodiment, the first accelerometer 30 is in the form of a reference accelerometer operating in a first dynamic range and configured to generate specific force data 33, and the second accelerometer 32 is in the form of a navigation accelerometer operating in a second dynamic range and configured to generate specific force data 33. The controller 26 configured or programmed to determine whether the second (navigation) accelerometer 32 is experiencing force in the first dynamic range. If so, reference data 41 is determined based at least in part upon the specific gravity data 33 generated by the by the first (reference) accelerometer 30. This reference data 41 is then applied to one or more of the navigation routine 37 to generate navigation data 39. However, if the second (navigation) accelerometer 32 is experiencing force outside of the first dynamic range, and within the second dynamic range, the specific force data 33 of the second (navigation) accelerometer 32 will continue to be used in a navigation routine 37 to generate the navigation data 39. In summary, the more accurate specific force data 33 (of the first (reference) accelerometer 30) will be used when the force conditions are suitable. Otherwise, the less accurate specific force data 33 of the second (navigation) accelerometer 32 will continue to be used in the navigation routine 37 to generate the navigation data 39.

In this embodiment, the first dynamic range of the first (reference) accelerometer 30 is from about −2 g to about +2 g, and in another preferred and non-limiting embodiment, from about −1.7 g to about +1.7 g. The second dynamic range of the second (navigation) accelerometer 32 is from about −50 g to about +50 g. Therefore, the specific force data 33 generated by the first (reference) accelerometer 30 can be used in place of the specific force data 33 generated by the second (navigation) accelerometer 32 when appropriate. This, in turn, provides an improved (more accurate and precise) navigational process. It is further envisioned that a number of additional accelerometers 24 could be used in the context and environment of the present invention, and these accelerometers 24 could operate in a variety of specified dynamic ranges to function in different environments and applications.

In a still further preferred and non-limiting embodiment, and as illustrated in FIG. 5, provided is a navigation accelerometer 38 operating in a first dynamic range and configured to generate specific force data 33, and an event accelerometer 40 operating in a second dynamic range and configured to generate specific force data 33. Again, and preferably, each of these accelerometers 38, 40 are in the form of an accelerometer triad for use in measuring in the x-, y-, and z-direction. Still further, in this embodiment, both of these accelerometers 38, 40 are configured and capable of providing or outputting data at a navigation rate. In general, and according to this preferred and non-limiting embodiment, the low dynamic range navigation accelerometer 38 is utilized as the primary navigation accelerometer, while the high dynamic range event accelerometer 40 is utilized to capture data during certain conditions, e.g., momentary events of high acceleration.

In this embodiment, it is recognized that shoe-mounted pedestrian navigation systems are unique in that the majority of the inertial data lies within a low dynamic range. In particular, typical inertial data lies within the range of about −5 g to about +5 g. However, during impact and other momentary events, the accelerometer signals easily exceed this dynamic range. Therefore, rather than choose a single accelerometer to cover the entire dynamic range of the inertial navigation system 1, the present embodiment provides the low dynamic range navigation accelerometer 38 and the high dynamic range event accelerometer 40. The low dynamic range accelerometer 38 (±10 g, and in one preferred and non-limiting embodiment, ±5 g) is the primary navigation sensor during normal navigational conditions 42, and the high dynamic range accelerometer 40 (±100 g, and in one preferred and non-limiting embodiment, ±50 g) is used during other specified navigational conditions 42.

The controller 26 is programmed or configured to determine the presence of at least one navigational condition 42, and based upon this condition 42, determine or derive navigation data 39 and/or other data 34 (through the use of one or more navigation routines 37 or algorithms) from the accelerometer 24 that provides the most accurate data during such a condition 42. While this determination may be made based upon data derived from the force experience of the navigation accelerometer 38 or the event accelerometer 40, it may also be made based upon data derived from or obtained by a condition sensor 44. This condition sensor 44 is in communication with and controlled by the controller 26, and is further configured or capable of sensing the presence or absence of some predetermined navigational condition 42.

Accordingly, this embodiment optimizes the sensor noise characteristics for the majority of the data, yet provides capability to measure high dynamic range motions. The navigation algorithm or routine 37 estimates the biases of the navigation accelerometer 38, and then deterministically sets those of the event accelerometer 40. Further, the navigational condition 42 may be an operational range, a specified threshold, velocity, rate, frequency, vibration, time, temperature, a stationary condition, an impact condition, a movement condition, an environmental condition, or the like. In another embodiment, the controller 26 is configured or programmed to set bias data, error data, drift data, and/or tilt data, as used by a navigation routine 37 to generate navigation data 39 by the event accelerometer 40 during a navigational condition 42. This data can be set on a predetermined basis, a periodic basis, and/or a dynamic basis. In a still further embodiment, the controller 26 is configured to apply at least one condition algorithm to determine whether the specific force data 33 of the navigation accelerometer 38 or the specific force data 33 of the event accelerometer 40 should be used in connection with the navigation algorithm or routine 37 to generate navigation data 39.

One consideration in this embodiment is the handling of the inertial measurement noise statistics in relationship to measurement correction timing. As the system propagates, it is necessary to communicate to the navigation algorithm or routine 37 (e.g., as programmed on the controller 26) the noise characterization parameters of the inertial sensors 20. If the inertial navigation system 1 contains two accelerometers 38, 40, the algorithm will need to adjust these parameters depending on the active accelerometer 38, 40. These parameters include the accelerometer's velocity random walk and rate random walk. Velocity random walk describes how the uncertainty in the velocity estimate error grows with time, and rate random walk describes how the uncertainty in the accelerometer bias estimate error grows with time. If only the primary navigation accelerometer 38 biases are estimated, then the implications of applying corrections when the high-range event accelerometer 40 is active should be considered. This is less of a consideration when the present invention is used in connection with shoe-mounted pedestrian navigation systems, as the majority of the aiding measurements occur when the shoe is at rest.

In addition, the use of this embodiment mitigates the initial attitude error via the utilization of, in one preferred and non-limiting embodiment, a ±5 g accelerometer for initialization rather than a ±50 g accelerometer. Like the ±1.7 g accelerometer discussed above, the ±5 g accelerometer should preferably have improved noise statistics with respect to the ±50 g accelerometer. Accordingly, this embodiment provides the dual use of two accelerometers 38, 40 (preferably, accelerometer triads), where each accelerometer 38, 40 exhibits a different dynamic range. The low dynamic range navigation accelerometer 38 could also be used in the initialization process. This embodiment provides for the optimization of the sensor noise parameters in connection with pedestrian navigation systems, as well as effectively determines which accelerometer 38, 40 should be used in specific situations. As discussed above, any number of accelerometers 24 could be used with a variety of optimal ranges for addressing specific navigational conditions 42.

As illustrated in FIG. 6, the inertial navigation unit 10 includes multiple sensors 20 rigidly positioned within a common housing 16. Further, some attachment arrangement 46 can be used to attach the housing 16 to the user U. For example, a detachable strap unit 48 connected to the housing 16 could be used for connection to the boot B of the user U, which is one preferable unit used in the firefighting environment. However, any suitable attachment unit 46 is envisioned.

In one preferred and non-limiting embodiment, provided is a method of initializing an inertial navigation unit 10, including: generating specific force data 33 by an initialization accelerometer 30 operating in a first dynamic range; determining initialization data 35 based at least in part upon the specific force data 33 generated by the initialization accelerometer 30; applying at least a portion of the initialization data 35 to at least one navigation routine 37; and generating navigation data 39 based at least in part upon the specific force data 33 of a navigation accelerometer 32, which is operating in a second dynamic range, and the at least one navigation routine 37. The initialization data 35 includes at least one of the following: attitude data, tilt data, specific force data, acceleration data, bias data, error data, orientation data, rotation data, noise data, and/or drift data.

In another preferred and non-limiting embodiment, the present invention provides an inertial navigation method, including generating specific force data 33 by a reference accelerometer 30 operating in a first dynamic range; determining reference data 41 based at least in part upon the specific force data 33 generated by the reference accelerometer 30; generating navigation data 39 based at least in part upon specific force data 33 generated by a navigation accelerometer 32, which is operating in a second dynamic range, and at least one navigation routine 37; and at least one of: (a) validating at least a portion of the navigation data 39; (b) validating at least a portion of the specific force data 33 generated by the navigation accelerometer 32; (c) modifying at least a portion of the at least one navigation routine 39 using at least a portion of the reference data 41; and/or (d) setting at least one of the following: bias data, error data, drift data, tilt data, or any combination thereof, used by the at least one navigation routine 37 to generate navigation data 39.

In a further preferred and non-limiting embodiment, the present invention provides a method of navigating using an inertial navigation unit 10, including determining whether a navigation accelerometer 32, which operates in a second dynamic range, is experiencing force in a first dynamic range that is within the second dynamic range; and if the navigation accelerometer 32 is experiencing force in the first dynamic range, determining reference data 41 based at least in part upon the specific force data 33 generated by a reference accelerometer 30, which operates in the first dynamic range; applying at least a portion of the reference data 41 to at least one navigation routine 37; and generating navigation data 39 based at least in part upon the at least one navigation routine 37.

In another preferred and non-limiting embodiment, the present invention provides a method of navigating using an inertial navigation unit 10 including a navigation accelerometer 38 operating in a first dynamic range and configured to generate specific force data 33 and an event accelerometer 40 operating in a second dynamic range and configured to generate specific force data 33, wherein the second dynamic range is greater than the first dynamic range. The method includes: determining at least one navigational condition 42; and based at least in part upon the navigational condition 42, either: (a) generating navigation data 39 based at least in part upon the specific force data 33 generated by the navigation accelerometer 38 and at least one navigation routine 37; or (b) generating navigation data 39 based at least in part upon specific force data 33 generated by the event accelerometer 40 and the at least one navigation routine 37.

In this manner, the present invention provides an inertial navigation system 1 and inertial navigation unit 10 and associated methods that lead to quick system initialization and are useful in connection with existing and available inertial sensor systems. The inertial navigation system 1 and unit 10 and associated methods according to the present invention improve the initial estimate of attitude using an additional accelerometer, and assist in the initialization, correction, and/or validation of the measurements of one or more components in the system.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent units that are within the spirit and scope of the appended claims. For example, it is to be understood that the present invention contemplates that, to the extent possible, one or more features of any embodiment can be combined with one or more features of any other embodiment.

What is claimed is:

1. An inertial navigation unit, comprising:
    a reference accelerometer operating in a first dynamic range and configured to generate specific force data;
    a navigation accelerometer operating in a second dynamic range and configured to generate specific force data, wherein the reference accelerometer and the navigation accelerometer are rigidly fixed with respect to each other at all times, such that the reference accelerometer and the navigation accelerometer are subject to the same specific force at all times; and
    at least one controller configured to:
        (i) determine reference data based at least in part upon the specific force data generated by the reference accelerometer;
        (ii) generate navigation data based at least in part upon the specific force data generated by the navigation accelerometer and at least one navigation routine; and
        (iii) at least one of: (a) validate at least a portion of the navigation data; (b) validate at least a portion of the specific force data generated by the navigation accelerometer; (c) modify at least a portion of the at least one navigation routine using at least a portion of the reference data; (d) set at least one of the following: bias data, error data, drift data, tilt data, or any combination thereof, used by the at least one navigation routine to generate navigation data; or any combination thereof.

2. The inertial navigation unit of claim 1, wherein the second dynamic range of the navigation accelerometer is greater than the first dynamic range of the reference accelerometer.

3. The inertial navigation unit of claim 2, wherein the first dynamic range of the reference accelerometer is from about −2 g to about +2 g.

4. The inertial navigation unit of claim 2, wherein the second dynamic range of the navigation accelerometer is from about −50 g to about +50 g.

5. The inertial navigation unit of claim 1, wherein the first dynamic range of the reference accelerometer is from about −2 g to about +2 g.

6. The inertial navigation unit of claim 5, wherein the second dynamic range of the navigation accelerometer is from about −50 g to about +50 g.

7. The inertial navigation unit of claim 1, wherein the second dynamic range of the navigation accelerometer is from about −50 g to about +50 g.

8. The inertial navigation unit of claim 1, wherein each of the reference accelerometer and the navigation accelerometer comprises an accelerometer triad.

9. The inertial navigation unit of claim 1, wherein the reference accelerometer and the navigation accelerometer are rigidly positioned at least partially within a common housing, which includes an attachment arrangement configured to attach the housing to a user.

10. An inertial navigation method, comprising:
    generating, by an inertial navigation unit, specific force data by a reference accelerometer operating in a first dynamic range;
    determining, by the inertial navigation unit, reference data based at least in part upon the specific force data generated by the reference accelerometer, wherein the reference accelerometer and the navigation accelerometer are rigidly fixed with respect to each other at all times, such that the reference accelerometer and the navigation accelerometer are subject to the same specific force at all times;
    generating, by the inertial navigation unit, navigation data based at least in part upon specific force data generated by a navigation accelerometer, which is operating in a second dynamic range, and at least one navigation routine; and
    at least one of: (a) validating, by the inertial navigation unit, at least a portion of the navigation data; (b) validating, by the inertial navigation unit, at least a portion of the specific force data generated by the navigation accelerometer; (c) modifying, by the inertial navigation unit, at least a portion of the at least one navigation routine using at least a portion of the reference data; (d) setting, by the inertial navigation unit, at least one of the following: bias data, error data, drift data, tilt data, or any combination thereof, used by the at least one navigation routine to generate navigation data; or any combination thereof.

11. An inertial navigation unit, comprising:
    a reference accelerometer operating in a first dynamic range and configured to generate specific force data;
    a navigation accelerometer operating in a second dynamic range and configured to generate specific force data, wherein the reference accelerometer and the navigation accelerometer are rigidly fixed with respect to each other at all times, such that the reference accelerometer and the navigation accelerometer are subject to the same specific force at all times; and
    at least one controller configured to:
        (i) determine whether the navigation accelerometer is experiencing force within the first dynamic range;
        (ii) if the navigation accelerometer is experiencing force within the first dynamic range, determine reference data based at least in part upon the specific force data generated by the reference accelerometer;
        (iii) apply at least a portion of the reference data to at least one navigation routine; and
        (iv) generate navigation data based at least in part upon the at least one navigation routine.

12. The inertial navigation unit of claim 11, wherein the second dynamic range of the navigation accelerometer is greater than the first dynamic range of the reference accelerometer.

13. The inertial navigation unit of claim 12, wherein the first dynamic range of the reference accelerometer is from about −2 g to about +2 g.

14. The inertial navigation unit of claim 12, wherein the second dynamic range of the navigation accelerometer is from about −50 g to about +50 g.

15. The inertial navigation unit of claim 11, wherein the first dynamic range of the reference accelerometer is from about −2 g to about +2 g.

16. The inertial navigation unit of claim 15, wherein the second dynamic range of the navigation accelerometer is from about −50 g to about +50 g.

17. The inertial navigation unit of claim 11, wherein the second dynamic range of the navigation accelerometer is from about −50 g to about +50 g.

18. The inertial navigation unit of claim 11, wherein each of the reference accelerometer and the navigation accelerometer comprises an accelerometer triad.

19. The inertial navigation unit of claim 11, wherein the at least one controller is further configured to determine when to generate navigation data using the reference data of the reference accelerometer.

20. A method of navigating using an inertial navigation unit, comprising:
- determining, by an inertial navigation unit, whether a navigation accelerometer, which operates in a second dynamic range, is experiencing force in a first dynamic range that is within the second dynamic range; and
- if the navigation accelerometer is experiencing force in the first dynamic range, determining, by the inertial navigation unit, reference data based at least in part upon the specific force data generated by a reference accelerometer, which operates in the first dynamic range, wherein the reference accelerometer and the navigation accelerometer are rigidly fixed with respect to each other at all times, such that the reference accelerometer and the navigation accelerometer are subject to the same specific force at all times;
- applying, by the inertial navigation unit, at least a portion of the reference data to at least one navigation routine; and
- generating, by the inertial navigation unit, navigation data based at least in part upon the at least one navigation routine.

* * * * *